March 11, 1969    E. ROSENGREN    3,432,185
JOINTING AND SEALING MEANS
Filed Jan. 17, 1967
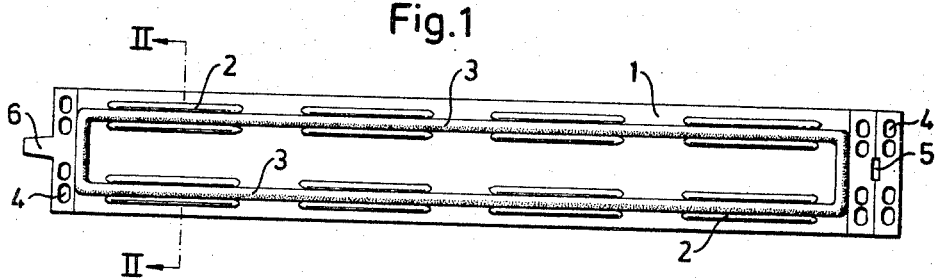
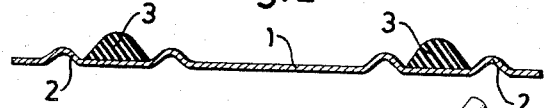
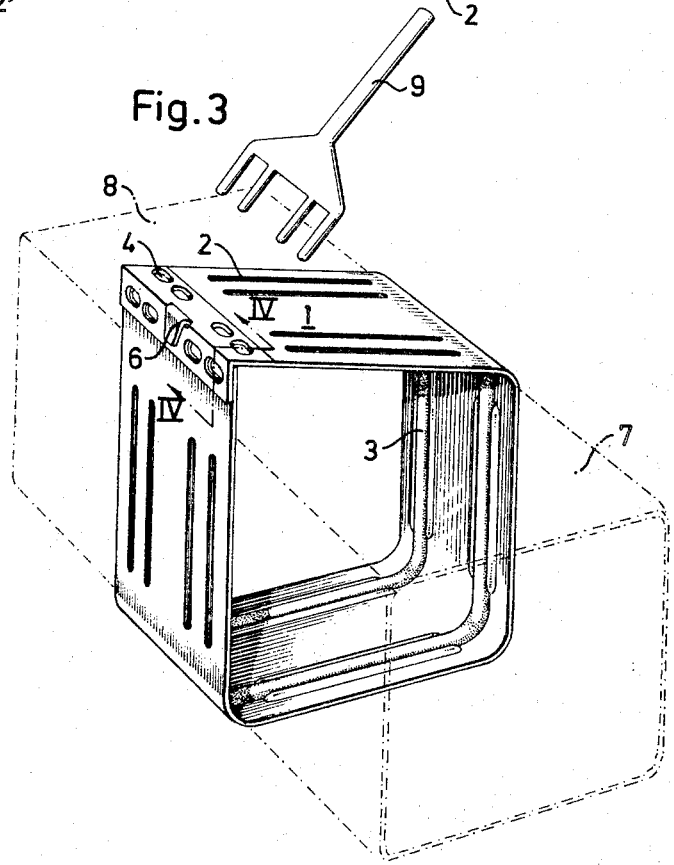

United States Patent Office 3,432,185
Patented Mar. 11, 1969

3,432,185
JOINTING AND SEALING MEANS
Eric Rosengren, Oresundsvagen 19,
Bjarred, Sweden
Filed Jan. 17, 1967, Ser. No. 609,916
Claims priority, application Sweden, Jan. 21, 1966,
773/66
U.S. Cl. 285—39
Int. Cl. F16l 55/00, 35/00
4 Claims

ABSTRACT OF THE DISCLOSURE

A clamp-on joining and sealing means is provided for two abutting pipe ends having essentially the same cross sectional shape. An elongated strip of tough, bendable metal or the like is formed with two parallel rows of apertures across one end and one row of apertures across the other end and with groups of recesses defining channels on the inner face of the strip at locations corresponding to the number of sides on the pipes to be joined. Beads of plastic sealant are deposited in the channels. The strip is then bent around the abutting pipe ends until the two extreme end rows of apertures are aligned, after which a forked tool engages the third row of apertures to pull the strip until the three rows of apertures are all aligned, thereby clamping the strip in tight sealing engagement with the pipe ends.

---

The present invention relates to jointing and sealing means and more particularly to such means for jointing preferably tubular objects having essentially the same outer cross-sectional shape and for sealing the joint between the said objects.

For that type of piping which is used for ventilation purposes in buildings, socket pipes are generally used, in which case the joint between the socket and the spigot of adjacent pipe ends is sealed by means of oakum. This manner of sealing the pipes is of course both time-consuming and difficult, but a still greater drawback consists in the fact that it is not possible to manufacture the socket pipes by continuous pressing, which is the most inexpensive method of manufacturing pipes. No simple and reliable means for jointing and sealing joints between abutting pipe sections is known.

The purpose of the invention is therefore to provide a jointing and sealing means which is capable of holding together and sealing the joint between abutting objects, preferably of tubular shape, e.g. asbestos cement pipes.

The jointing and sealing means according to the invention is essentially characterized in that it comprises a strip of thin and flexible material and sealing material provided on one surface of the strip, and is adapted to be fixed around the end portions of the abutting objects by tightening the strip so as to cause the sealing material to engage the objects positively on both sides of the joint between them.

The jointing and sealing means according to the invention is particularly well suited for uniting pipes of angular cross section and more particularly ventilation pipes of asbestos cement.

In an advantageous embodiment of the jointing and sealing means according to the invention the flexible material of the strip is provided with depressions within two or more portions extending transversally over the strip, said depressions making the said portions rigid, the strip between said portions being foldable so that it can be wrapped around the end portions of the objects and each of the rigid portions having essentially the same shape as a corresponding portion of the objects.

The latter embodiment of the jointing and sealing means is particularly well adapted for jointing pipes of angular cross section, the rigid portions of the strip being made essentially plane. In jointing and sealing means according to the invention which are meant for jointing ventilation pipes of asbestos cement having angular, usually square, cross section, it is, however, advisable to give the rigid portions of the strip at that surface of the strip which is provided with the sealing material a slightly convex shape longitudinally of the strip in order that the sealing may be perfect even if the asbestos cement pipes should deviate slightly from the correct shape. In fact, it is relatively common that the walls of the asbestos cement pipes are concave to some small extent. The tightening of the strip is brought about in the easiest and most suitable way by folding the ends of the strip together, and in a preferred embodiment the strip has apertures provided at its ends, the tightening of the strip and the jointing of its ends being done by means of a fork-like tool introduced into the apertures.

An embodiment of the invention will be described below with reference to the accompanying drawings.

FIG. 1 shows an embodiment of a jointing and sealing means according to the invention in a plane position.

FIG. 2 shows an enlarged cross section on line II—II in FIG. 1.

FIG. 3 shows the jointing means when placed around the ends of two pipes to be jointed but before the joining means has been tightened.

Figure 4:
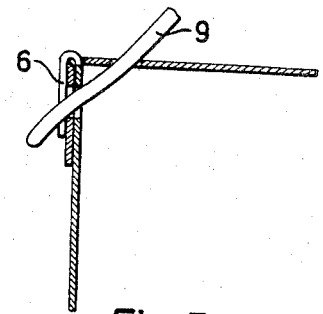
FIG. 4 shows an enlarged partial section on line IV—IV of the jointing means shown in FIG. 3, with a tool for folding its ends together introduced into apertures provided in the end portions.

The jointing means shown in FIG. 1 comprises a strip 1 having that side facing upwardly which is meant to be in contact with two objects to be jointed. The strip 1 consists of relatively thin zinc or aluminium sheets and, in the embodiment shown, is meant for jointing two pipes of essentially square outer cross section. The strip 1 has four transverse portions which are made rigid by means of depressions 2 and which after the jointing of the pipes are to face each one of the four side walls of the pipes. Between these rigid portions the strip is relatively easy to bend and fold. At that side which is to face the pipes, the strip 1 has two parallel plastic or rubber beads 3 extending longitudinally of the strip and up to adjacent its ends, said beads being united at their ends by means of transverse bead portions. At its ends the strip 1 is provided with apertures 4 which are arranged in rows parallel to the end edges, two of the rows being provided at one end of the strip and one row at the other end of the strip. In addition, the strip has a short slot 5 between the rows of apertures at the first-mentioned end of the strip and a flap 6 adapted to be introduced into the slot 5 at that end of the strip which is provided with one row of apertures only. The apertures 4, the slot 5 and the flap 6 serve to facilitate the placing and folding together of the jointing means around the pipe ends in a manner to be described below.

Figure 5:
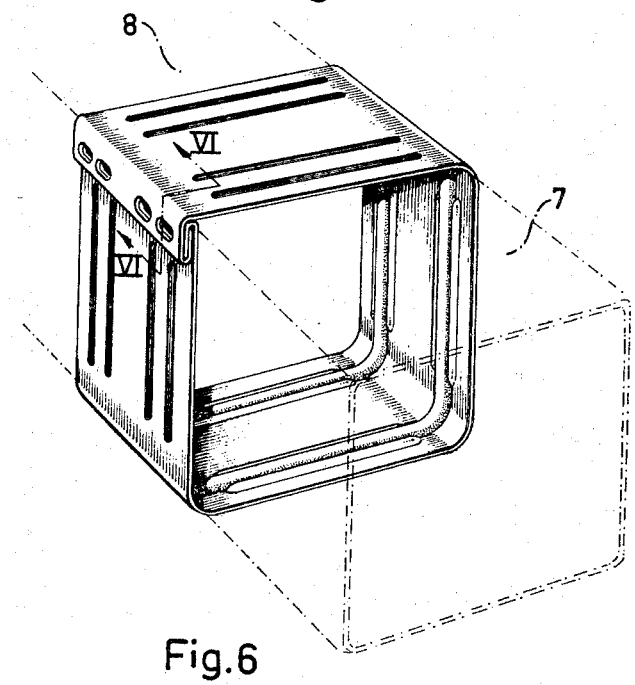
FIG. 5 shows the jointing means when it has been tightened around the ends of the pipes by folding its ends together.
Figure 6:
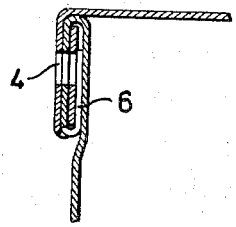
FIG. 6 shows an enlarged partial section on line VI—VI in FIG. 5.

FIG. 3 shows the jointing and sealing means according to the invention after it has been wrapped around the ends of two pipes 7 and 8 to be jointed. Prior to the placing of the jointing strip in the position shown, the extreme end portion of that end of the strip which is provided with two rows of apertures is bent essentially at right angles between the said rows. When the strip 1 is to be folded around the pipe ends, the ends of the strip are moved together so that the bent portion of one end will lie outside the edge of the other end portion, with the apertures 4 in the said end portion registering with the apertures in the end portion which is bent at right angles. The flap 6 is then introduced into the slot 5 and is bent downwardly so that the jointing strip 6 will be held loosely around the pipe ends. The folding of the strip ends and the consequent tightening of the uniting strip 1 around the pipe ends is preferably done with a fork-like tool 9 having a number of prongs corresponding to the number of apertures 4 in each row of apertures. The fork prongs are introduced into the apertures 4 in the manner shown in FIG. 4 so that they extend diagonally between the apertures 4 corresponding to each other in the two rows of apertures registering with each other and the inner row of apertures of that end of the strip which is provided with two rows of apertures. The tool 9 is then pressed in counterclockwise direction in FIG. 4, whereby the end portions of the strip will be folded together to the position shown in FIGS. 5 and 6 and whereby the strip will be tightened around the pipe ends.

It may be advantageous to give those portions of the strip 1 which are provided with rigidifying depressions 2 a slightly convex form longitudinally of the strip at the side surface provided with the sealing material 5 in order to ensure that the sealing material will be in contact with the walls of the pipes 7, 8 also in case these should deviate somewhat from the correct shape. As a matter of fact, it is relatively common that the side walls of asbestos cement pipes, for the jointing of which the strip according to the invention is preferably intended, have a slight concave shape. This possibility of pre-stressing the rigid portions of the strip to the desired extent is of considerable importance for achieving reliable sealing under all conditions and is one of the great advantages of the invention.

The joints which are jointed and sealed by means of the device according to the invention have such stability that at the building of ventilation systems it is possible to put together a large number of pipe sections, e.g., on a working table, and then lift the whole unit into the desired position.

There are a great many possibilities of modifying the jointing and sealing means within the scope of the invention with respect to the purpose for which the jointing and sealing means is to be used.

I claim:
1. Jointing and sealing means for jointing endwise abutting objects having essentially the same outer cross-sectional shape and for sealing the joint between said objects, comprising a strip of flexible material, two parallel beads of resilient material provided on one surface of the strip and extending longitudinally thereof, transverse bead means provided at the ends of said longitudinally extending beads to unite the latter, end portions of said strip forming apertures which are arranged in rows parallel to the end edges of said strip, two rows of apertures being formed at one end of said strip and one row at the other end of said strip, the end portion of said strip being provided with said two rows of apertures being bent between said two rows in the direction of the surface of said strip being provided with said beads, said apertures being arranged in relation to each other so that when said end portions of said strip are put together to a position where said bent portion overlies the other end portion of said strip the apertures of each of said rows will register with the apertures of the other two of said rows so as to provide for the insertion of a tool into said registering apertures for folding together said end portions and tightening said strip around the end portions of said objects so as to cause said beads to engage said objects positively on both sides of the joint between them and to cause said transverse bead means at each end of said longitudinally extending beads to engage said objects and each other.

2. Jointing and sealing means as claimed in claim 1, in which said strip is provided with depressions within at least two transverse portions and is foldable between said portions to be wrappable around the end portions of the objects, each of said portions having essentially the same shape as a corresponding portion of the objects.

3. Jointing and sealing means as claimed in claim 2, in which said depressions are cooperating to form channels for said beads.

4. Jointing and sealing means for jointing endwise abutting objects having essentially the same outer cross-sectional shape and for sealing the joint between said objects, comprising a strip of flexible material, sealing material provided on one surface of said strip, end portions of said strip forming apertures which are arranged in rows parallel to the end edges of said strip, two rows of apertures being formed at one end of said strip and one row at the other end of said strip, the end portion of said strip being provided with said two rows being bent between said two rows of apertures in the direction of the surface of said strip being provided with said sealing material, said apertures being arranged in relation to each other so that when said end portions of said strip are put together to a position where said bent portion overlies the other end portion of said strip the apertures of each of said rows will register with the apertures of the other two of said rows so as to provide for the insertion of a tool into said registering apertures for folding together said end portions and tightening said strip around the end portions of said objects so as to cause said sealing material to engage said objects positively on both sides of the joint between them.

References Cited

UNITED STATES PATENTS

| 294,937 | 3/1884 | Towle | 138—99 |
|---------|--------|-------|--------|
| 312,406 | 2/1885 | Towle | 24—20 X |
| 766,965 | 8/1904 | McGowan | 285—293 |
| 813,674 | 2/1906 | Skirrow | 138—99 |
| 3,100,658 | 8/1963 | Miller et al. | 285—293 X |

FOREIGN PATENTS

| 725,513 | 1/1966 | Canada. |
| 958,709 | 2/1957 | Germany. |

CARL W. TOMLIN, *Primary Examiner.*

RAMON S. BRITTS, *Assistant Examiner.*

U.S. Cl. X.R.

254—79; 285—373, 424